United States Patent
Nishide et al.

(10) Patent No.: US 10,850,649 B2
(45) Date of Patent: Dec. 1, 2020

(54) VEHICLE SEAT CONTROLLER (71) Applicant: HONDA MOTOR CO., LTD., Tokyo (JP)

(72) Inventors: Harutomi Nishide, Wako (JP); Kentaro Yoshimura, Raymond, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 267 days.

(21) Appl. No.: 15/988,205

(22) Filed: May 24, 2018

(65) Prior Publication Data
US 2019/0359093 A1 Nov. 28, 2019

(51) Int. Cl.
*B60N 2/30* (2006.01)
*B60N 2/02* (2006.01)

(52) U.S. Cl.
CPC .......... *B60N 2/3011* (2013.01); *B60N 2/0232* (2013.01); *B60N 2/0252* (2013.01); *B60N 2002/0272* (2013.01)

(58) Field of Classification Search
None
See application file for complete search history.

(56) References Cited

U.S. PATENT DOCUMENTS

| | | | | |
|---|---|---|---|---|
| 2005/0006939 A1* | 1/2005 | Hancock | ............... | B60N 2/0228 297/354.12 |
| 2006/0208549 A1* | 9/2006 | Hancock | ............... | B60N 2/0232 297/342 |
| 2007/0235297 A1* | 10/2007 | Stoschek | ............... | B60N 2/0228 200/5 R |
| 2013/0062921 A1* | 3/2013 | Meyer | ............... | B60N 2/5685 297/284.8 |
| 2014/0217792 A1* | 8/2014 | Meyer | ............... | B60N 2/5685 297/284.8 |
| 2016/0280095 A1* | 9/2016 | Frye | ............... | B60N 2/0244 |
| 2017/0334320 A1* | 11/2017 | Heeg | ............... | B60N 2/0232 |
| 2018/0208280 A1* | 7/2018 | Minger | ............... | B63B 32/70 |

FOREIGN PATENT DOCUMENTS

| | | |
|---|---|---|
| JP | H03-112385 | 5/1991 |
| JP | H05-85234 | 4/1993 |

* cited by examiner

*Primary Examiner* — Peter D Nolan
*Assistant Examiner* — Demetra R Smith-Stewart
(74) *Attorney, Agent, or Firm* — Rankin, Hill & Clark LLP (57) ABSTRACT

A seat position controller performs seat position change processing by performing longitudinal position change processing and at least one of vertical position change processing and tilt angle change processing. When the seat position controller performs the seat position change processing, a change degree setting part sets the degree of speed change in the longitudinal direction of a seat main body during the longitudinal position change processing smaller than the degree of speed change in the vertical direction of the seat main body during the vertical position change processing, and the degree of speed change in a tilt angle direction of a seat back during the tilt angle change processing.

8 Claims, 7 Drawing Sheets

| OPERATION METHOD | LONGITUDINAL POSITION CHANGE PROCESSING | | | | VERTICAL POSITION CHANGE PROCESSING | | | | TILT ANGLE CHANGE PROCESSING | | | |
|---|---|---|---|---|---|---|---|---|---|---|---|---|
| | FRONTWARD | | REARWARD | | UPWARD | | DOWNWARD | | FRONTWARD | | REARWARD | |
| | START | STOP | START | STOP | START | STOP | START | STOP | START | STOP | START | STOP |
| MANUAL SEAT SWITCH | LEVEL 2 | LEVEL 3 | LEVEL 2 | LEVEL 3 | LEVEL 2 | LEVEL 3 | LEVEL 2 | LEVEL 3 | LEVEL 2 | LEVEL 3 | LEVEL 2 | LEVEL 3 |
| SEAT MEMORY SWITCH | LEVEL 1 | LEVEL 1 | LEVEL 1 | LEVEL 1 | LEVEL 2 | LEVEL 1 | LEVEL 1 | LEVEL 3 | LEVEL 2 | LEVEL 2 | LEVEL 2 | LEVEL 2 |
| REMOTE CONTROL | LEVEL 4 | LEVEL 4 | LEVEL 4 | LEVEL 4 | LEVEL 4 | LEVEL 4 | LEVEL 4 | LEVEL 4 | LEVEL 4 | LEVEL 4 | LEVEL 4 | LEVEL 4 |

32a 32b 32c 32d
32

VEHICLE SEAT CONTROLLER

BACKGROUND OF THE INVENTION

Field of the Invention

The present invention relates to a vehicle seat controller.

Description of the Related Art

Heretofore, as a vehicle seat controller that changes the seat position with a motor, a controller has been proposed (see Japanese Patent Laid-Open No. 3-112385 and Japanese Patent Laid-Open No. 5-85234, for example) in which when the controller changes a position of a vehicle seat in the longitudinal direction, the controller limits a voltage applied to the motor upon starting and stopping of the displacement, to ease a shock that the occupant feels at the time of the change in the seat position.

In some commercially available vehicles, not only the position in the longitudinal direction, but also a position in the vertical direction and a tilt angle of a seat back are changeable by an actuator such as a motor. The shock that the occupant feels also needs to be eased when the actuator changes the seat position of the vehicle seat in multiple directions and in directions other than the horizontal direction. Additionally, the change in the seat position in multiple directions and in directions other than the horizontal direction needs to be made more promptly.

The present invention has been made in view of the foregoing, and aims to provide a vehicle seat controller that can promptly change a seat position in multiple directions or in directions other than the horizontal direction, while minimizing shock.

SUMMARY OF THE INVENTION

A first embodiment of a vehicle seat controller of the present invention is a vehicle seat controller for controlling operation of a vehicle seat including a seat main body that has a seat back and a seat cushion and is provided in a vehicle, a longitudinal position change part that changes a position of the seat main body in the longitudinal direction, a vertical position change part that changes a position of the seat main body in the vertical direction, and a tilt angle change part that changes a tilt angle of the seat back, the vehicle seat controller including: a seat position controller that performs seat position change processing in which a seat position of the vehicle seat is changed to a predetermined target seat position, by performing longitudinal position change processing in which the longitudinal position change part changes the position of the seat main body in the longitudinal direction, and at least any one of vertical position change processing in which the vertical position change part changes the position of the seat main body in the vertical direction, and tilt angle change processing in which the tilt angle change part changes the tilt angle of the seat back; and a change degree setting part that, when the seat position controller performs the seat position change processing, sets the degree of speed change in the longitudinal direction of the seat main body during the longitudinal position change processing smaller than the degree of speed change in the vertical direction of the seat main body during the vertical position change processing, and the degree of speed change in a tilt angle direction of the seat back during the tilt angle change processing.

Next, a second embodiment of the vehicle seat controller of the present invention is a vehicle seat controller for controlling operation of a vehicle seat including a seat main body that has a seat back and a seat cushion and is provided in a vehicle, a vertical position change part that changes a position of the seat main body in the vertical direction, and a tilt angle change part that changes a tilt angle of the seat back, the vehicle seat controller including: a seat position controller that performs seat position change processing in which a seat position of the seat main body is changed to a predetermined target seat position, by performing vertical position change processing in which the vertical position change part changes the position of the seat main body in the vertical direction, and tilt angle change processing in which the tilt angle change part changes the tilt angle of the seat back; and a change degree setting part that, when the seat position controller performs the seat position change processing, sets the degree of speed change in the vertical direction of the seat main body during the vertical position change processing smaller than the degree of speed change in a tilt angle direction of the seat back during the tilt angle change processing.

When the seat main body is moved upward by the vertical position change processing, the change degree setting part may set the degree of speed change in the vertical direction of the seat main body upon stopping of the upward movement smaller than the degree of speed change in the vertical direction of the seat main body upon starting of the upward movement.

When the seat main body is moved downward by the vertical position change processing, the change degree setting part may set the degree of speed change in the vertical direction of the seat main body upon starting of the downward movement smaller than the degree of speed change in the vertical direction of the seat main body upon stopping of the downward movement.

Next, a third embodiment of the vehicle seat controller of the present invention is a vehicle seat controller for controlling operation of the vehicle seat including a seat main body and a vertical position change part that changes a position of the seat main body in the vertical direction, the vehicle seat controller including: a seat position controller that performs seat position change processing in which a seat position of the seat main body is changed to a predetermined target seat position, by performing vertical position change processing in which the vertical position change part changes the position of the seat main body in the vertical direction; and a change degree setting part that, when the seat position controller performs the seat position change processing, sets the degree of speed change in the vertical direction of the seat main body upon starting of a downward movement of the seat main body by the vertical position change processing smaller than the degree of speed change in the vertical direction of the seat main body upon starting of an upward movement of the seat main body by the vertical position change processing.

When the seat main body is moved upward by the vertical position change processing, the change degree setting part may set the degree of speed change in the vertical direction of the seat main body upon stopping of the upward movement smaller than the degree of speed change in the vertical direction of the seat main body upon stopping of the downward movement when the seat main body is moved downward by the vertical position change processing.

When changing the seat position of a vehicle seat, the embodiments of the vehicle seat controller of the present invention sets the degree of speed change in the longitudinal direction smaller than the degree of speed change in the vertical direction and in the tilt angle direction. Additionally, when changing the seat position of a vehicle seat, the vehicle seat controller of the present invention sets the degree of speed change in the vertical direction smaller than the degree of speed change in the tilt angle direction. Moreover, when changing the seat position of a vehicle seat, the vehicle seat controller of the present invention sets the degree of speed change in the vertical direction upon starting of a downward movement smaller than the degree of speed change in the vertical direction upon starting of an upward movement. With these settings, changes in the seat position in multiple directions or in a direction other than the horizontal direction can be made promptly, while minimizing shock.

DETAILED DESCRIPTION OF THE PREFERRED EMBODIMENTS

An example of an embodiment of a vehicle seat controller of the present invention will be described with reference to FIGS. 1 to 7.

1. Configuration of Vehicle Seat Controller

Figure 1:
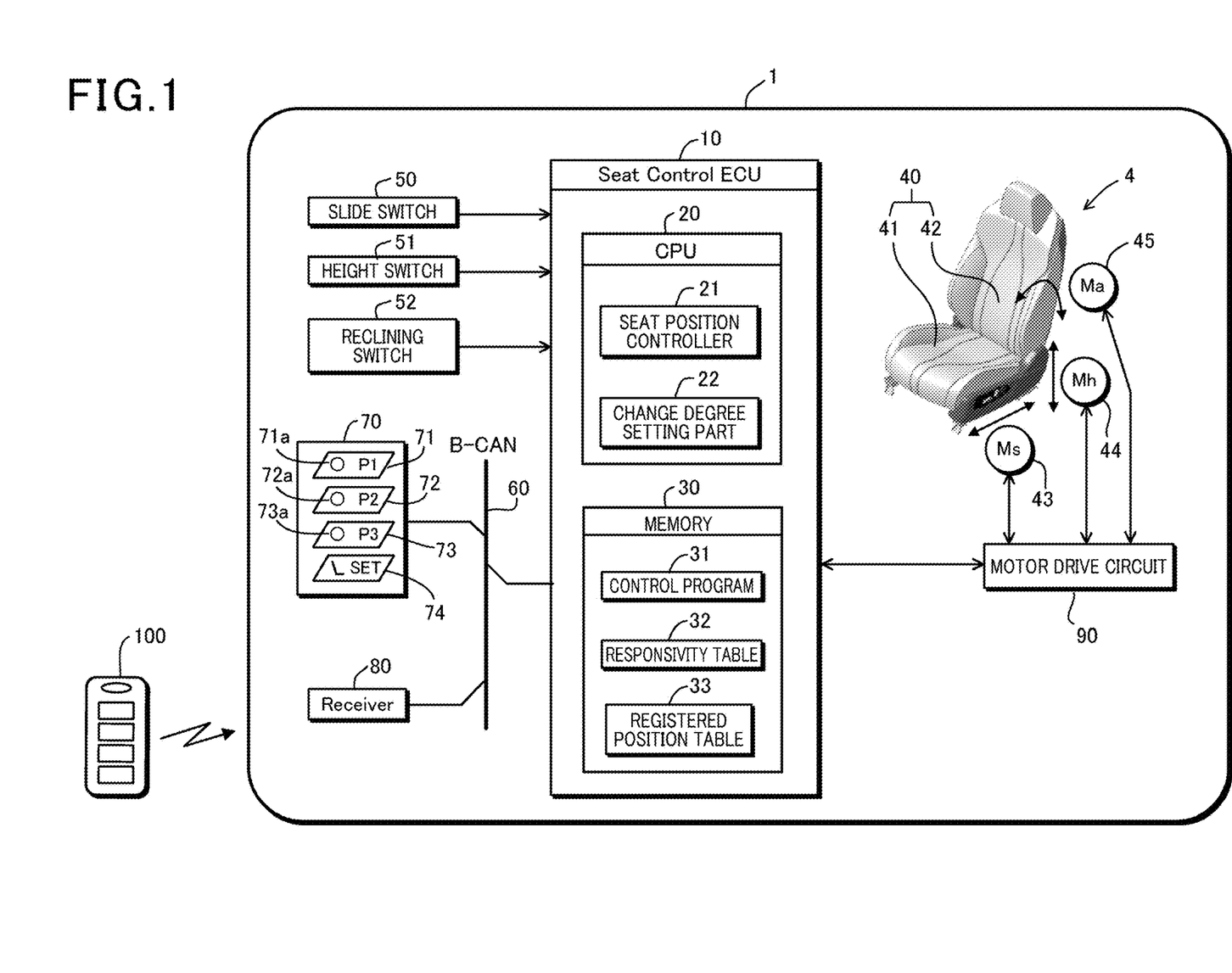
FIG. 1 is a configuration diagram of a vehicle in which a vehicle seat controller is installed.

FIG. 1 illustrates a configuration of a vehicle in which a vehicle seat controller of the embodiment is installed. Referring to FIG. 1, a vehicle seat controller 10 of the embodiment is installed in a vehicle 1 on which a vehicle seat 4 is mounted.

Figure 2:
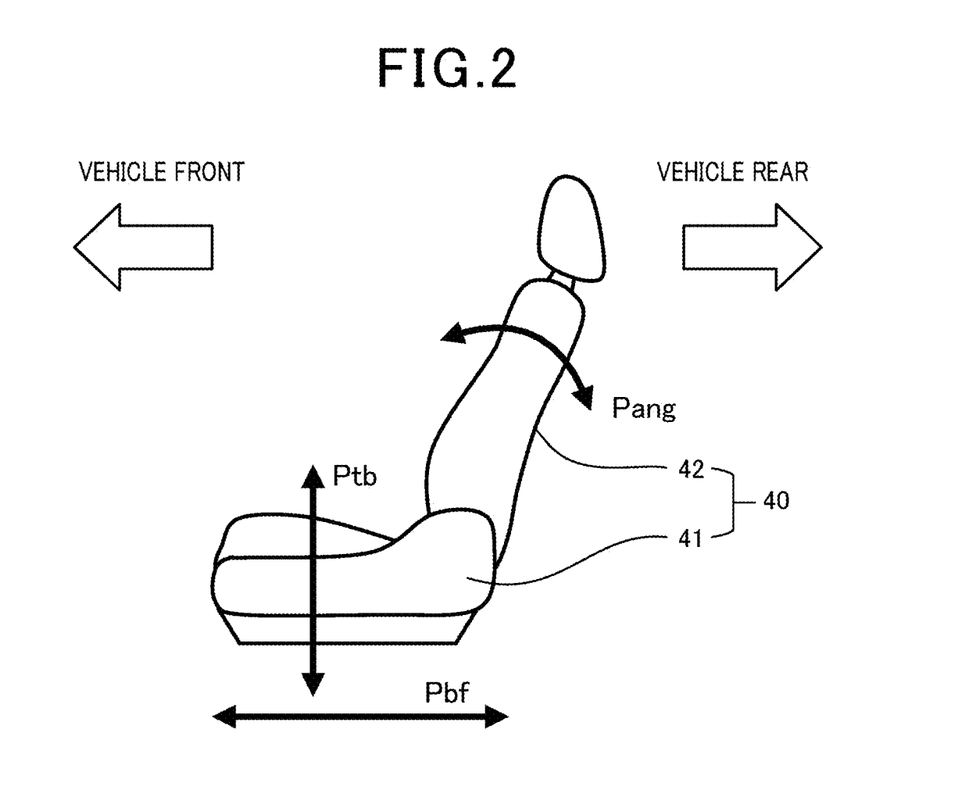
FIG. 2 is an explanatory drawing of change directions of a position of a seat main body.

The vehicle seat 4 has a seat main body 40 having a seat cushion 41 and a seat back 42, and has a function of electrically changing the seat position in three directions as illustrated in FIG. 2. The three directions include the longitudinal direction denoted by Pbf, the vertical direction (height direction from floor of vehicle 1) denoted by Ptb, and a tilt angle direction (direction of reclining angle) of the seat back 42 denoted by Pang.

As illustrated in FIG. 1, the vehicle seat 4 includes a longitudinal motor 43 (corresponding to longitudinal change part of present invention) that displaces the seat main body 40 in the longitudinal direction, a vertical motor 44 (corresponding to vertical change part of present invention) that displaces the seat main body 40 in the vertical direction, and a tilt angle motor 45 (corresponding to tilt angle change part of present invention) that displaces the seat back 42 in the tilt angle direction.

The vehicle seat controller 10 is an electronic control unit (ECU) configured of a central processing unit (CPU) 20, a memory 30, an unillustrated interface circuit, and other components. In the following description, the vehicle seat controller 10 is also referred to as an ECU 10. The ECU 10 is connected with a slide switch 50 that instructs a change in position of the seat main body 40 in the longitudinal direction, a height switch 51 that instructs a change in position of the seat main body 40 in the vertical direction, and a reclining switch 52 that instructs a change in reclining angle of the seat back 42.

The ECU 10 is also connected with a seat memory switch 70 and a remote control receiver 80 through a body controller area network (B-CAN) 60. The seat memory switch 70 has three position switches 71 to 73 and a position registration switch 74. The position switches 71 to 73 are respectively provided with Lamps 71a to 73a each indicating that a corresponding one of the position switches 71 to 73 is selected.

A user of the vehicle 1 can operate the seat memory switch 70 to register three seat positions of the seat main body 40, and give an instruction to change the position of the seat main body 40 to a registered seat position. The user of the vehicle 1 can also operate a remote control 100, to give an instruction to change the position of the seat main body 40 to a registered seat position.

The CPU 20 that forms the ECU 10 functions as a seat position controller 21 and a change degree setting part 22, by reading and executing a control program 31 of the ECU 10 stored in the memory 30.

The seat position controller 21 controls operation of each of motors 43, 44, 45 through a motor drive circuit 90. Each of the motors 43, 44, 45 includes a position detection sensor (not shown) such as a rotary encoder. The seat position controller 21 recognizes positions of the seat main body 40 in longitudinal and vertical directions, and a tilt angle of the seat back 42, by receiving detection signals of the position detection sensors through the motor drive circuit 90.

The seat position controller 21 performs longitudinal position change processing in which the position of the seat main body 40 in the longitudinal direction is changed by driving of the longitudinal motor 43, vertical position change processing in which the position of the seat main body 40 in the vertical direction is changed by driving of the vertical motor 44, and tilt angle change processing in which the tilt angle of the seat back 42 is changed by driving of the tilt angle motor 45.

The seat position controller 21 performs longitudinal position change processing according to operations of the slide switch 50, performs vertical position change processing according to operations of the height switch 51, and performs tilt angle change processing according to operations of the reclining switch 52. The seat position controller 21 also performs processing to register a seat position of the seat main body 40 that the user desires, according to operations of the seat memory switch 70.

Specifically, when the position registration switch 74 is operated by an occupant of the vehicle 1 while any of the position switches 71 to 73 is selected, the seat position controller 21 assigns a seat position (set by longitudinal direction position, vertical direction position, and tilt angle) of the seat main body 40 at this time point to the selected position switch, and registers the seat position in a registered position table 33.

Figure 5:
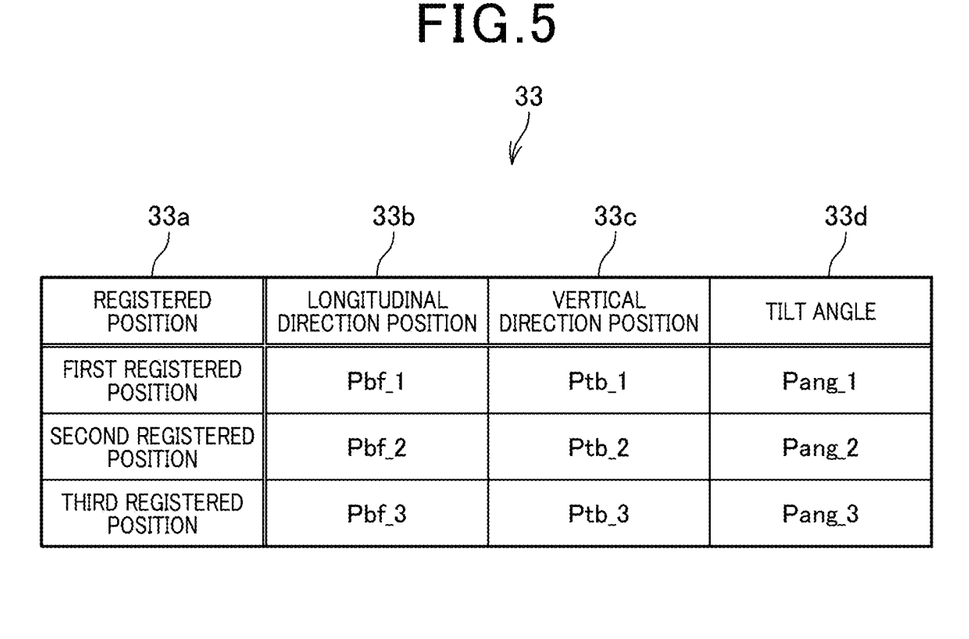
FIG. 5 is an explanatory drawing of a registered position table.

As illustrated in FIG. 5, a longitudinal direction position 33b, a vertical direction position 33c, and a tilt angle 33d of first to third registered positions respectively assigned to the three position switches 71 to 73 are registered in the registered position table 33. For example, in the first registered position, Pbf_1 is registered as a longitudinal direction position, Ptb_1 is registered as a vertical direction position, and Pang_1 is registered as a tilt angle.

When the occupant operates any of the position switches 71 to 73 with seat positions thus registered in the registered position table 33, the seat position controller 21 refers to the registered position table 33. Then, the seat position controller 21 performs seat position change processing, to change the seat position of the seat main body 40 to the registered seat position assigned to the operated position switch. The seat position controller 21 performs seat position change processing by combining longitudinal position change processing, vertical position change processing, and tilt angle change processing.

Additionally, when the occupant operates the remote control 100 and instructs a change to any of the registered seat positions, too, the seat position controller 21 performs seat position change processing to change the seat position of the seat main body 40 to the instructed registered seat position.

The change degree setting part 22 sets the degree of change in the speed in each direction (longitudinal direction, vertical direction, tilt angle direction) of the seat main body 40, during longitudinal position change processing, vertical position change processing, and tilt angle change processing when the seat position controller 21 performs seat position change processing. In the embodiment, the change degree setting part 22 sets the degree of change in the speed at which the seat main body 40 is displaced in each direction, by varying the energization characteristic of each of the longitudinal motor 43, the vertical motor 44, and the tilt angle motor 45 in four levels.

Figure 3:
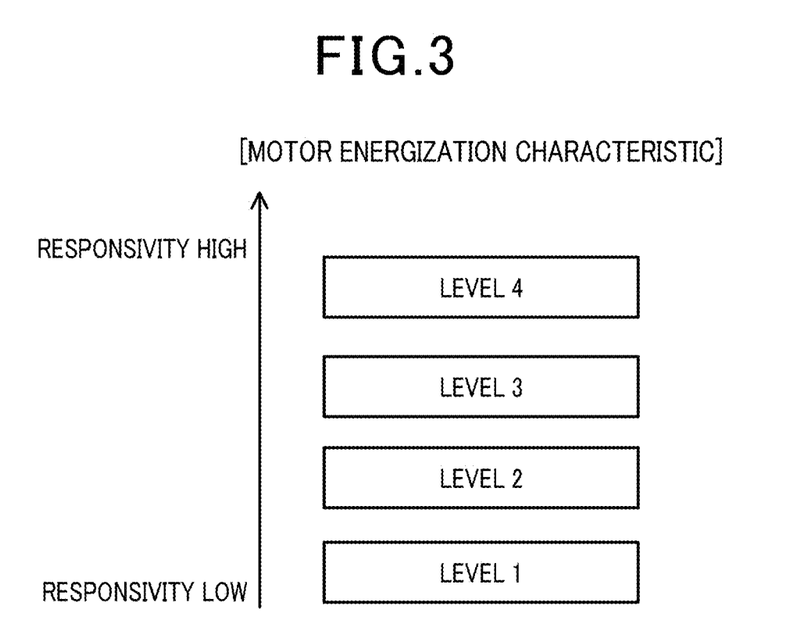
FIG. 3 is an explanatory drawing of setting levels of a motor energization characteristic.

As illustrated in FIG. 3, the change degree setting part 22 sets the energization characteristic of the longitudinal motor 43, the vertical motor 44, and the tilt angle motor 45 to four levels from level 1 having the lowest responsivity to level 4 having the highest responsivity. Hereinbelow, in descriptions common to the motors 43 to 45, the motors 43 to 45 are simply referred to as "motor." FIG. 4 illustrates the difference in speed change upon starting and stopping of operation of the motor attributable to a change in the energization characteristic, where the vertical axis represents motor speed and the horizontal axis represents time t.

Figure 4:
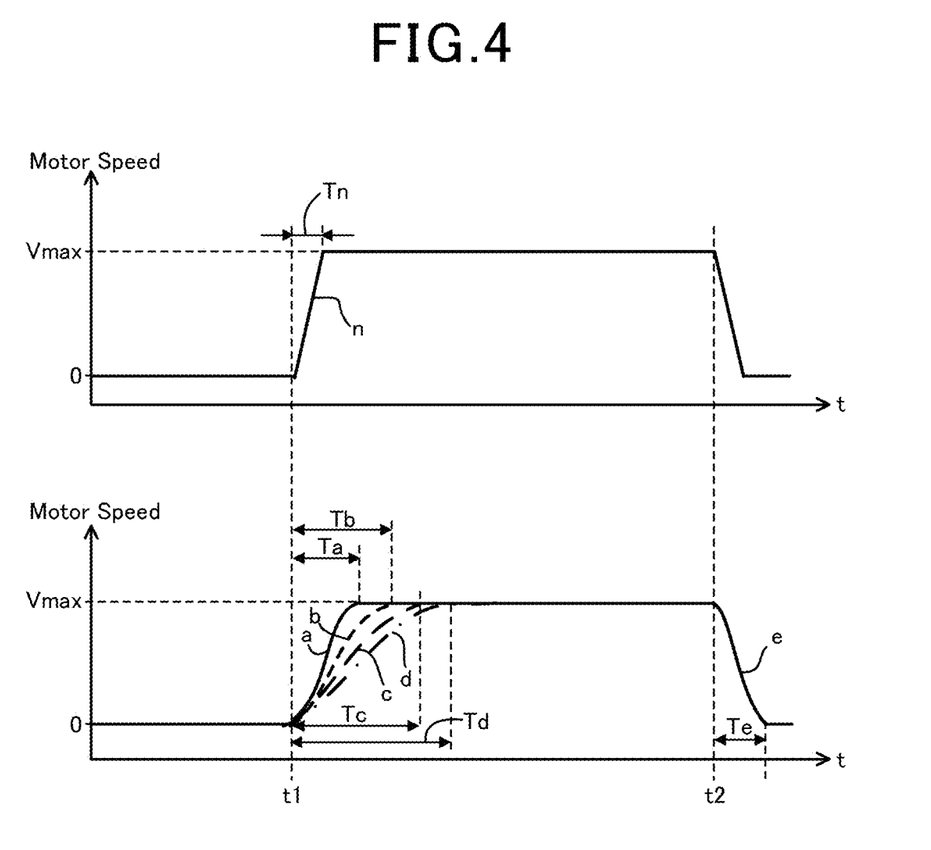
FIG. 4 is an explanatory drawing indicating the difference in time required to reach the maximum speed depending on the difference in responsivity level.

In FIG. 4, reference numeral t1 indicates a time point when start control of the motor is started, and reference numeral t2 indicates a time point when stop control of the motor is started. Reference sign n in the upper diagram indicates a case where the energization characteristic of the motor is set to level 4. In this case, the voltage applied to the motor is not limited, and therefore a shortest time Tn is taken by the motor to reach a maximum speed Vmax.

Reference signs a to d in the lower diagram indicate cases where the energization characteristic of the motor is set to gradually lower the responsivity in the order of a, b, c, and d. Here, times Ta, Tb, Tc, and Td taken to reach the maximum speed Vmax gradually become longer. Values of Ta, Tb, Tc, and Td are set to Ta=200 msec, Tb=300 msec, Tc=400 msec, and Td=500 msec. Note that the energization characteristic of the motor is controlled to form an opposite wave form upon stopping of the motor. Additionally, reference sign e indicates speed reduction when stop control of the motor is started from t2, and the time taken by the motor to stop from t2 is Te (Tn<Te<Tb). Of the responsivity levels 1 to 4 illustrated in FIG. 3, in FIG. 4, reference sign n corresponds to level 4, reference sign e corresponds to level 3, reference sign b corresponds to level 2, and reference sign d corresponds to level 1, for example.

Figure 6:
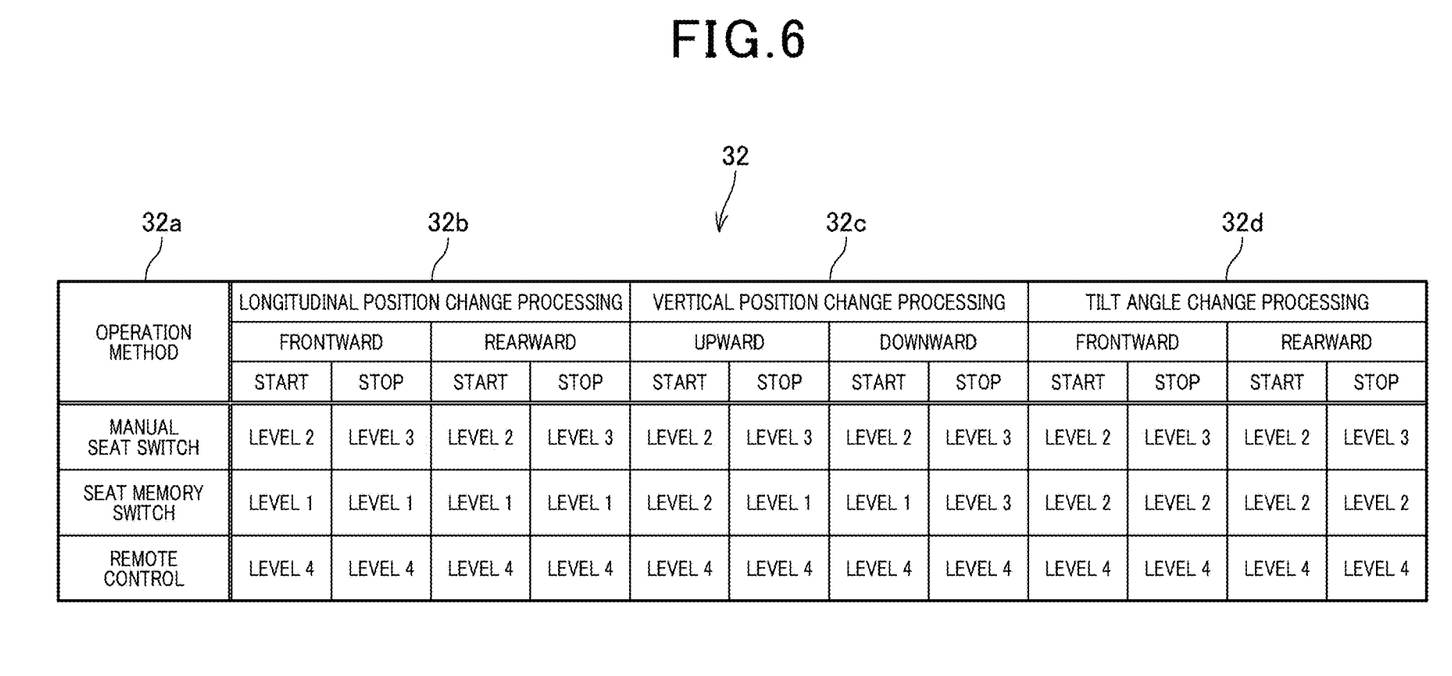
FIG. 6 is an explanatory drawing of a responsivity table.

The change degree setting part 22 refers to a responsivity table 32 to set responsivity levels upon starting and stopping of the motor during longitudinal position change processing, vertical position change processing, and tilt angle change processing. Referring to FIG. 6, the responsivity table 32 sets, for each operation method 32a of changing the seat position of the seat main body 40, responsivity levels 32b upon starting and stopping of longitudinal position change processing, responsivity levels 32c upon starting and stopping of vertical position change processing, and responsivity levels 32d upon starting and stopping of tilt angle change processing.

2. Seat Position Change Processing

Figure 7:
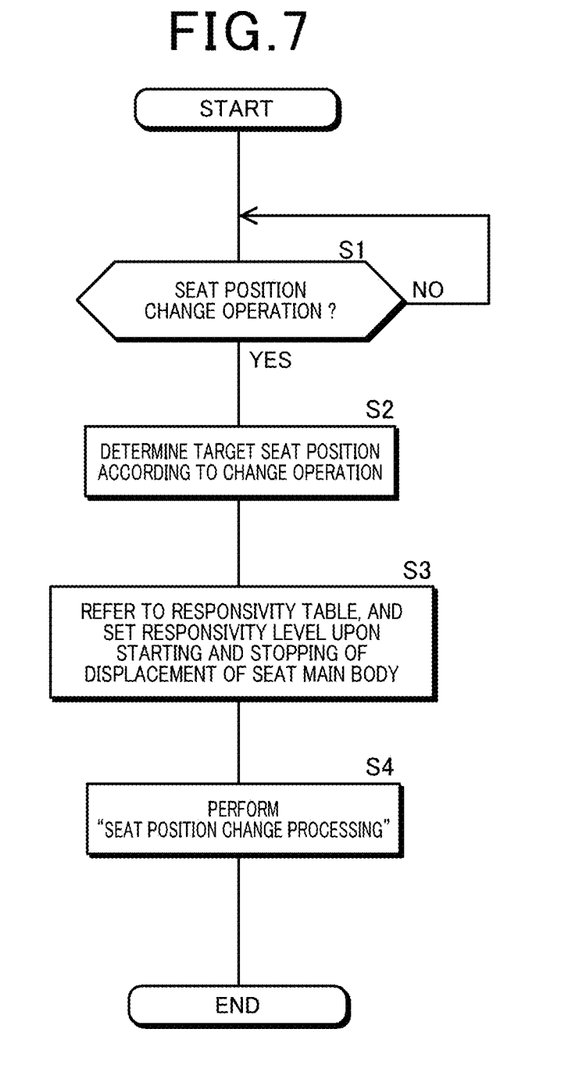
FIG. 7 is a flowchart of seat position change processing.

Next, sequential processing performed by the seat position controller 21 and the change degree setting part 22 according to a seat position change operation by the occupant will be described, according to a flowchart illustrated in FIG. 7. In step S1 of FIG. 7, the seat position controller 21 forwards the processing to step S2 if a seat position change operation has been made by any of the slide switch 50, the height switch 51, the reclining switch 52, the position switches 71 to 73 of the seat memory switch 70, and the remote control 100.

In step S2, the seat position controller 21 determines a target seat position according to the seat position change operation. Specifically, if the seat position change operation is made by operating the slide switch 50, the height switch 51, or the reclining switch 52, the seat position controller 21 sets, as the target seat position, a position displaced by a predetermined amount in a direction instructed by the switch from the current position of the seat main body 40.

For example, if a frontward position change is instructed by the slide switch 50, the seat position controller 21 sets, as the target seat position, a position of the seat main body 40 displaced frontward in the longitudinal direction by a predetermined amount from the current position.

If the seat position change operation is made by operating the position switches 71 to 73 of the seat memory switch 70 or the remote control 100, the seat position controller 21 sets a registered position designated by the operation as the target seat position. For example, if a seat position change is instructed by an operation of the position switch 71 of the seat memory switch 70, the seat position controller 21 refers to the registered position table 33 and sets the first registered position as the target seat position.

The following step S3 is processing performed by the change degree setting part 22. The change degree setting part 22 refers to the responsivity table 32, and sets, according to a seat position change operation, responsivity levels of the motor upon starting and stopping of displacement of the seat main body 40 during longitudinal position change processing, vertical position change processing, and tilt angle change processing.

For example, when a manual switch, which is one of the slide switch 50, the height switch 51, and the reclining switch 52, is operated, the change degree setting part 22 sets, in accordance with the responsivity table 32, the starting responsivity to level 2 and the stopping responsivity to level 3, during longitudinal position change processing, vertical position change processing, and tilt angle change processing. With this setting, the seat main body 40 can be started up gradually to suppress noise from the drive mechanism, and the seat main body 40 can be stopped promptly.

If a seat position change is instructed by the remote control 100, the change degree setting part 22 sets the responsivity of the motor upon starting and stopping of displacement of the seat main body 40 to level 4, during all of longitudinal position change processing, vertical position change processing, and tilt angle change processing. With this setting, when the user operates the remote control 100 from outside the vehicle 1 to instruct a seat position change with no occupant sitting in the seat main body 40, the user can displace the seat main body 40 promptly and change the seat position immediately.

If a seat position change is instructed by an operation of the position switches 71 to 73 of the seat memory switch 70, the change degree setting part 22 sets the responsivity of the longitudinal motor 43 upon starting and stopping of displacement of the seat main body 40 to level 1, during longitudinal position change processing. When moving the seat main body 40 upward during vertical position change processing, the change degree setting part 22 sets the responsivity of the vertical motor 44 upon starting and stopping of displacement of the seat main body 40 to level 2 when starting, and to level 1 when stopping. This can ease a stoppage shock that the occupant sitting in the seat main body 40 feels due to the weight of the occupant, upon stopping of the upward movement of the seat main body 40.

When moving the seat main body 40 downward during vertical position change processing, the change degree setting part 22 sets the responsivity of the vertical motor 44 to level 1 upon starting of displacement of the seat main body 40, and to level 3 upon stopping of displacement of the seat main body 40. This can ease a shock that the occupant sitting in the seat main body 40 feels at the start of downward movement due to the weight of the occupant, upon starting of the downward movement of the seat main body 40.

During vertical position change processing, the change degree setting part 22 sets the responsivity of the vertical motor 44 to level 1 upon starting of the downward movement of the seat main body 40, and to level 2 upon starting of the upward movement of the seat main body 40. This can ease a shock that the occupant sitting in the seat main body 40 feels at the start of downward movement due to the weight of the occupant, upon starting of the downward movement of the seat main body 40.

During vertical position change processing, when moving the seat main body 40 upward, the change degree setting part 22 sets the responsivity of the vertical motor 44 to level 1 upon stopping of the upward movement, and when moving the seat main body 40 downward, the change degree setting part 22 sets the responsivity of the vertical motor 44 to level 3 upon stopping of the downward movement. This can ease a stoppage shock that the occupant sitting in the seat main body 40 feels due to the weight of the occupant, upon stopping of the upward movement of the seat main body 40.

Moreover, during tilt angle change processing, the change degree setting part 22 sets the responsivity of the tilt angle motor 45 upon starting and stopping of displacement of the seat main body 40 to level 2, for both of frontward and rearward movements.

Thus, when a seat position change is instructed by the position switches 71 to 73, the change degree setting part 22 sets the responsivity of the longitudinal motor 43 during longitudinal position change processing, to the lowest level 1. Then, the change degree setting part 22 sets the responsivity of the vertical motor 44 during vertical position change processing, to levels 1 and 2 for upward movement, and to levels 1 and 3 for downward movement. The change degree setting part 22 also sets the responsivity of the tilt angle motor 45 during tilt angle change processing, to level 2 for both frontward and rearward movements at both starting and stopping of the movements.

Accordingly, when the seat position controller 21 performs seat position change processing by combining longitudinal position change processing, vertical position change processing, and tilt angle change processing, displacement in the longitudinal direction from which the occupant tends to feel a shock can be made smoothly, and displacement in the vertical direction and in the tilt angle can be made promptly. For this reason, a change to a target seat position can be completed promptly while easing a shock that the occupant feels.

When the tilt angle of the seat back 42 is changed, load of the occupant is hardly applied on the tilt angle motor 45, and the weight of the seat back 42 alone is applied on the tilt angle motor 45. Additionally, since the seat back 42 is reclined along with the movement of the upper-body of the occupant, the occupant does not feel discomfort even when the responsivity of the tilt angle motor 45 is set to level 2.

Hence, by setting the responsivity of the tilt angle motor 45 to level 2 and setting the responsivity of the vertical motor 44 to level 1 upon stopping of an upward movement and starting of a downward movement, a shock that the occupant feels at the time of upward and downward movements of the seat main body 40 can be eased, while a change to a target seat position can be made promptly.

3. Other Embodiments

In seat position change processing of the above embodiment, the responsivity of the longitudinal motor 43 during longitudinal position change processing is set lower than the responsivity of the vertical motor 44 during vertical position change processing and the responsivity of the tilt angle motor 45 during tilt angle change processing. As seat position change processing of another embodiment, the responsivity of the longitudinal motor 43 during longitudinal position change processing may be set lower than any one of the responsivity of the vertical motor 44 during vertical position change processing and the responsivity of the tilt angle motor 45 during tilt angle change processing.

In seat position change processing of the above embodiment, when moving the seat main body 40 upward while performing vertical position change processing, the responsivity of the vertical motor 44 upon stopping is set lower than that upon starting. However, this setting may be omitted.

In seat position change processing of the above embodiment, when moving the seat main body 40 downward while performing vertical position change processing, the responsivity of the vertical motor 44 upon starting is set lower than that upon stopping. However, this setting may be omitted.

The above embodiment illustrates an example where a longitudinal position change part, a vertical position change part, and a tilt angle change part of the present invention are configured of electrical motors 43 to 45. However, the components may be configured by use of other types of actuators using hydraulic or pneumatic control, for example.

Note that FIG. 1 is a schematic view of the configuration of the vehicle seat controller 10, which is sectionalized according to main processing contents to facilitate understanding of the present invention. The configuration of the vehicle seat controller 10 may be sectionalized differently. Processing of each component may be executed by a single hardware unit, or may be executed by multiple hardware units. Otherwise, processing of each component may be executed by a single program, or may be executed by multiple programs.

REFERENCE SIGNS LIST

1 ... vehicle, 4 ... vehicle seat, 10 ... vehicle seat controller, 20 ... CPU, 21 ... seat position controller, 22 ... change degree setting part, 30 ... memory, 31 ... control program, 32 ... responsivity table, 33 ... registered position table, 40 ... seat main body, 41 ... seat cushion, 42 ... seat back, 43 ... longitudinal motor, 44 ... vertical motor, 45 ... tilt angle motor, 50 ... slide switch, 51 ... height switch, 52 ... reclining switch, 60 ... B-CAN, 70 ... seat memory switch, 71 to 73 ... position switch, 74 ... position registration switch, 80 ... remote control receiver, 90 ... motor drive circuit, 100 ... remote control.

What is claimed is:

1. A vehicle seat controller for controlling operation of a vehicle seat including a seat main body that has a seat back and a seat cushion and is provided in a vehicle, a longitudinal position change part that changes a position of the seat main body in a longitudinal direction, a vertical position change part that changes a position of the seat main body in a vertical direction, and a tilt angle change part that changes a tilt angle of the seat back, the vehicle seat controller comprising:
   a seat position controller that performs seat position change processing in which a seat position of the vehicle seat is changed to a predetermined target seat position, by performing longitudinal position change processing in which the longitudinal position change part changes the position of the seat main body in the longitudinal direction, and at least any one of vertical position change processing in which the vertical position change part changes the position of the seat main body in the vertical direction, and tilt angle change processing in which the tilt angle change part changes the tilt angle of the seat back; and
   a change degree setting part that, when the seat position controller performs the seat position change processing, sets a time until a speed in the longitudinal direction of the seat main body during the longitudinal position change processing reaches a maximum speed smaller than a time until a speed in the vertical direction of the seat main body during the vertical position change processing reaches a maximum speed, and a time until a speed in a tilt angle direction of the seat back during the tilt angle change processing reaches a maximum speed.

2. The vehicle seat controller according to claim 1, wherein
   when the seat main body is moved upward by the vertical position change processing, the change degree setting part sets the degree of speed change in the vertical direction of the seat main body upon stopping of the upward movement smaller than the degree of speed change in the vertical direction of the seat main body upon starting of the upward movement.

3. The vehicle seat controller according to claim 1, wherein
   when the seat main body is moved downward by the vertical position change processing, the change degree setting part sets the degree of speed change in the vertical direction of the seat main body upon starting of the downward movement smaller than the degree of speed change in the vertical direction of the seat main body upon stopping of the downward movement.

4. A vehicle seat controller for controlling operation of a vehicle seat including: a seat main body that has a seat back and a seat cushion and is provided in a vehicle, a vertical position change part that changes a position of the seat main body in a vertical direction, and a tilt angle change part that changes a tilt angle of the seat back, the vehicle seat controller comprising:
   a seat position controller that performs seat position change processing in which a seat position of the seat main body is changed to a predetermined target seat position, by performing vertical position change processing in which the vertical position change part changes the position of the seat main body in the vertical direction, and tilt angle change processing in which the tilt angle change part changes the tilt angle of the seat back; and
   a change degree setting part that, when the seat position controller performs the seat position change processing, sets a time until a speed in the vertical direction of the seat main body during the vertical position change processing reaches a maximum speed smaller than a time until a speed in a tilt angle direction of the seat back during the tilt angle change processing reaches a maximum speed.

5. The vehicle seat controller according to claim 4, wherein
   when the seat main body is moved upward by the vertical position change processing, the change degree setting part sets the degree of speed change in the vertical direction of the seat main body upon stopping of the upward movement smaller than the degree of speed change in the vertical direction of the seat main body upon starting of the upward movement.

6. The vehicle seat controller according to claim 4, wherein
   when the seat main body is moved downward by the vertical position change processing, the change degree setting part sets the degree of speed change in the vertical direction of the seat main body upon starting of the downward movement smaller than the degree of speed change in the vertical direction of the seat main body upon stopping of the downward movement.

7. A vehicle seat controller for controlling operation of a vehicle seat including a seat main body and a vertical position change part that changes a position of the seat main body in the vertical direction, the vehicle seat controller comprising:
   a seat position controller that performs seat position change processing in which a seat position of the seat main body is changed to a predetermined target seat position, by performing vertical position change processing in which the vertical position change part changes the position of the seat main body in the vertical direction; and
   a change degree setting part that, when the seat position controller performs the seat position change processing, sets a time until a speed in the vertical direction of the seat main body upon starting of a downward movement of the seat main body by the vertical position change processing reaches a maximum speed smaller than a time until a speed in the vertical direction of the seat main body upon starting of an upward movement of the seat main body by the vertical position change processing reaches a maximum speed.

8. The vehicle seat controller according to claim 7, wherein
when the seat main body is moved upward by the vertical position change processing, the change degree setting part sets the degree of speed change in the vertical direction of the seat main body upon stopping of the upward movement smaller than the degree of speed change in the vertical direction of the seat main body upon stopping of the downward movement.

* * * * *